Aug. 29, 1950     T. V. MILLER     2,520,809
PLANT SETTING MACHINE
Filed June 7, 1944     5 Sheets-Sheet 1
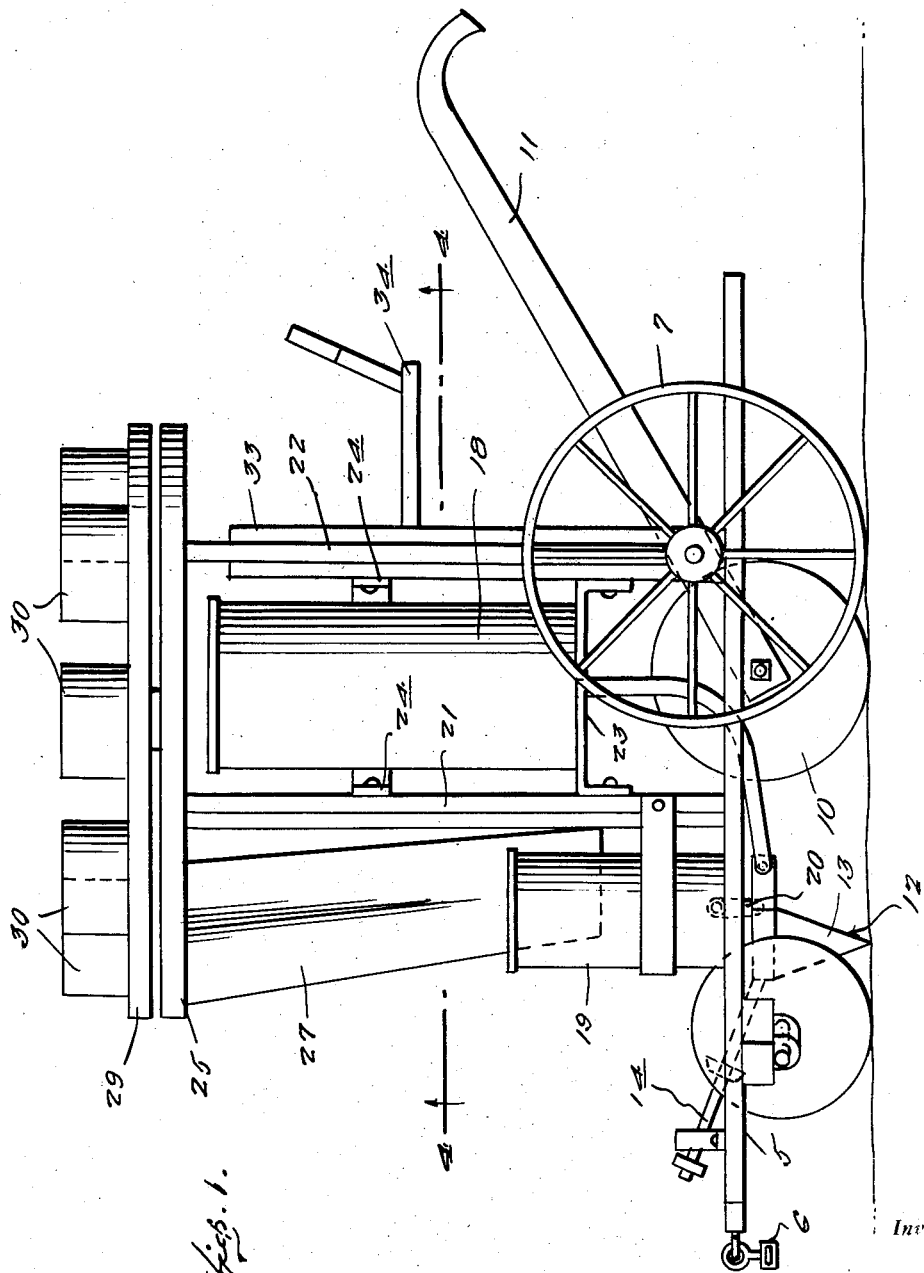
Inventor
THOMAS VIRGIL MILLER,
By Clarence A. O'Brien
and Harvey B. Jacobson

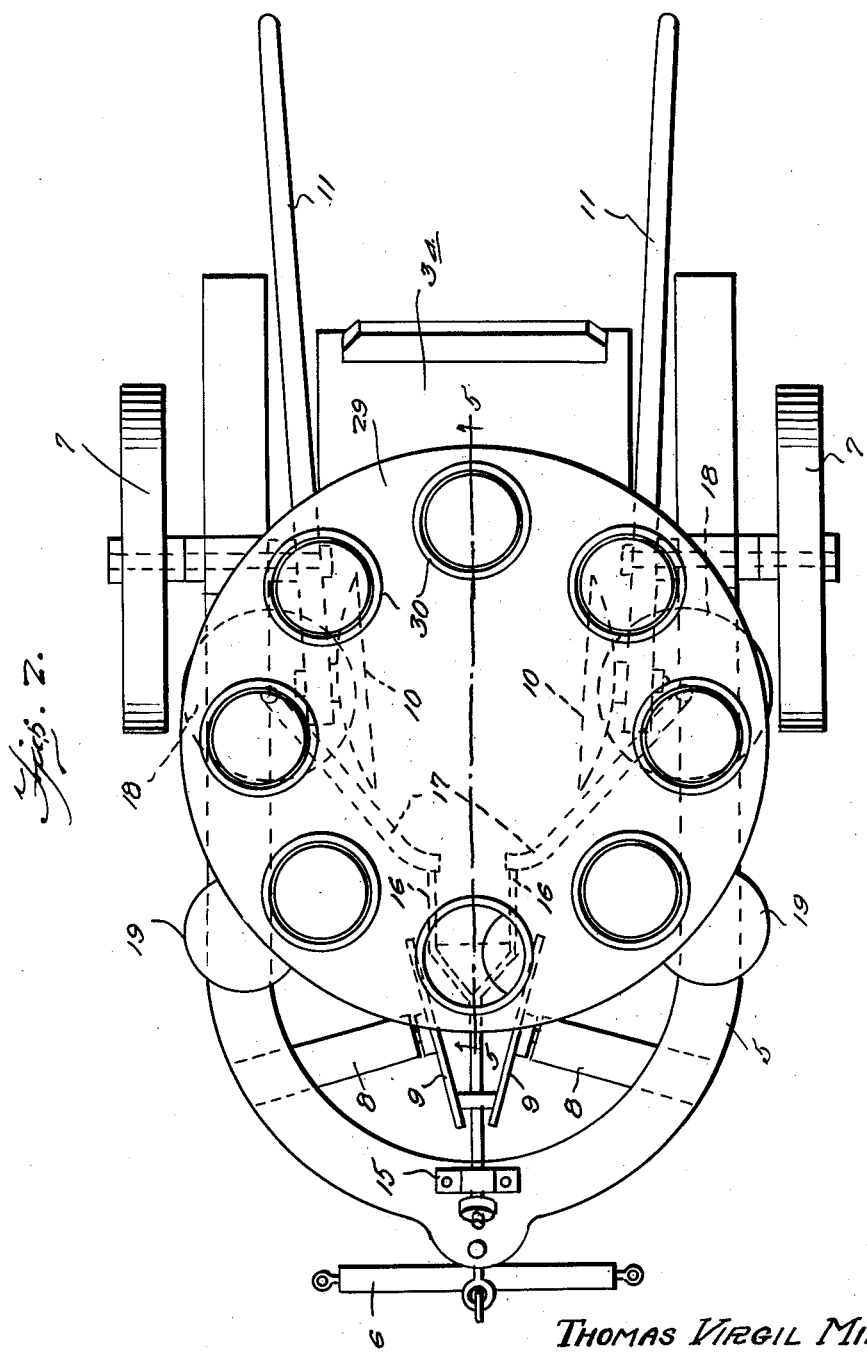

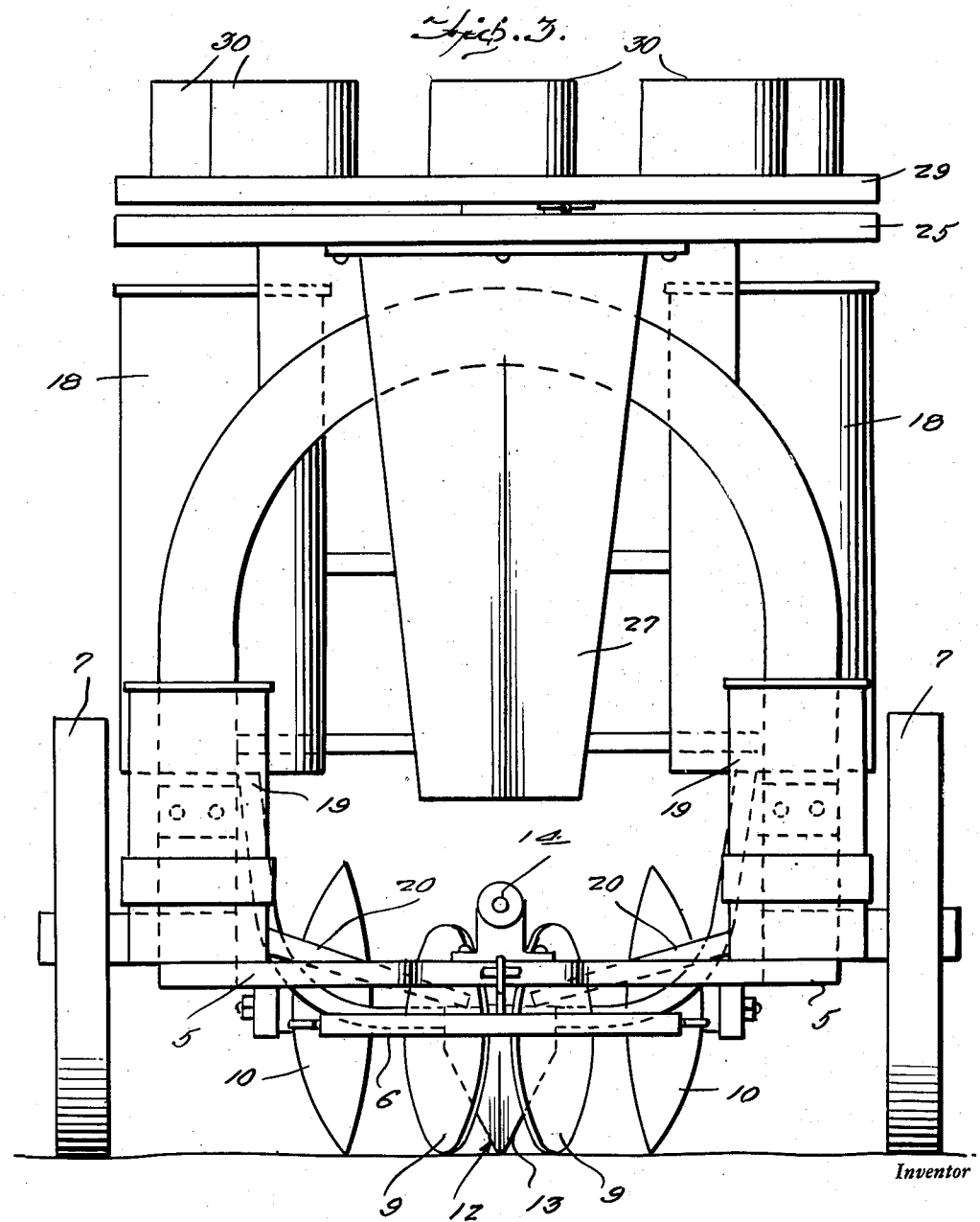

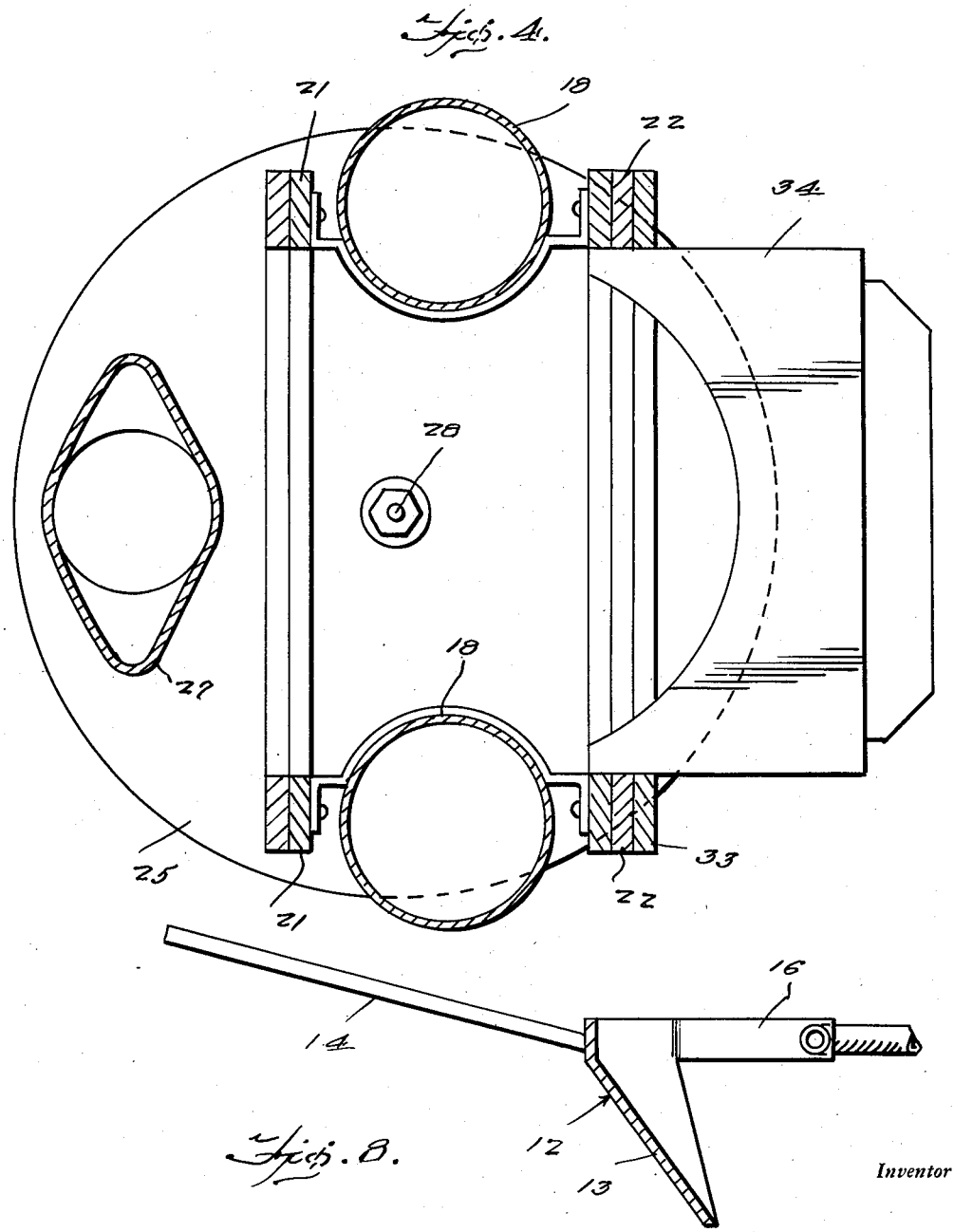

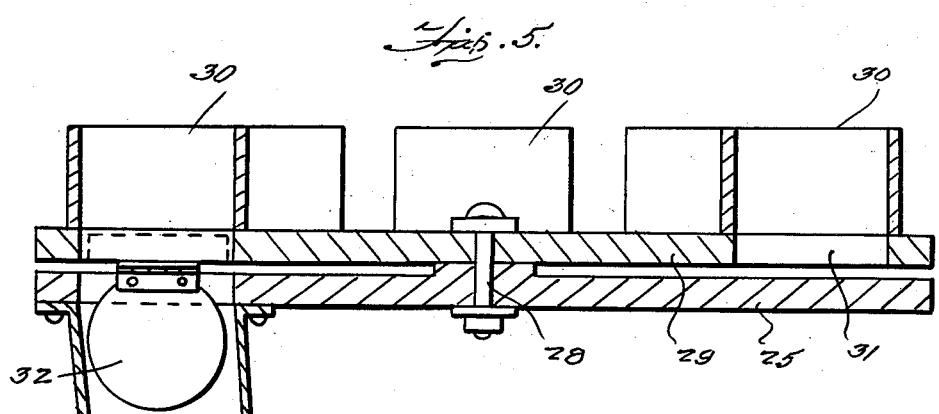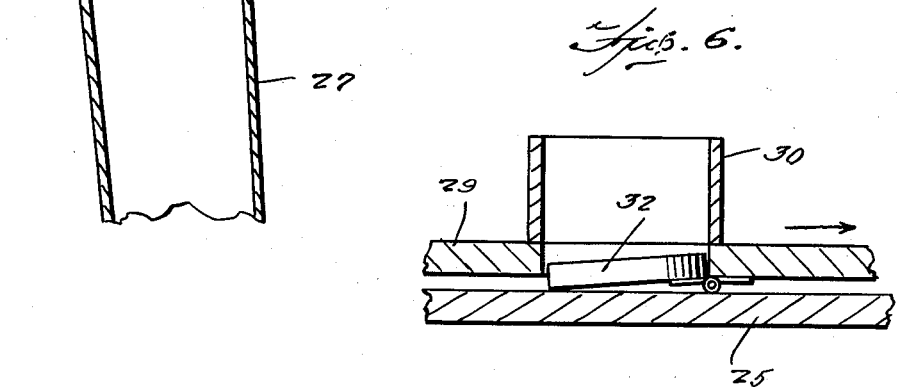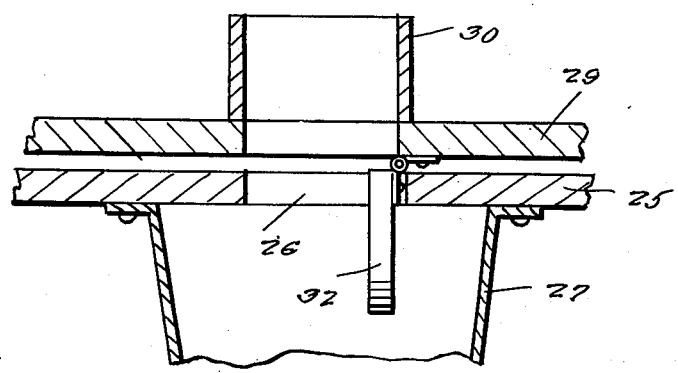

UNITED STATES PATENT OFFICE 2,520,809

PLANT SETTING MACHINE

Thomas Virgil Miller, Louisville, Ky.

Application June 7, 1944, Serial No. 539,078

1 Claim. (Cl. 111—7)

This invention relates to new and useful improvements in plant setting machines adapted for setting out in a substantially automatic manner young plants of various species.

An important object of the invention is to provide a plant setting machine including a plant feed or carrier adapted to supply enough plants for a considerable run of the machine.

Another important object of the invention is to provide a plant setting machine which in the operation of setting plants will place dry soil over the roots of the young plants and subsequently water is supplied to be absorbed by the dry soil, to the end that the roots of the young plants can draw on moist soil and not be shocked and perhaps killed by the direct contact of dry soil.

Still another important object of the invention is to provide a machine of the character stated which will reduce the necessity of manual assistance to about one-third.

Other objects and advantages of the invention will become apparent to the reader of the following description.

In the drawings:

Figure 1 represents a side elevational view of the machine.

Figure 2 is a top plan view.

Figure 3 is a front elevational view.

Figure 4 is a horizontal sectional view taken on the line 4—4 of Figure 1.

Figure 5 is a sectional view taken substantially on the line 5—5 of Figure 2.

Figure 6 is a fragmentary detailed sectional view of the plant carrier showing one of the wells with its yieldable bottom before it has reached the chute.

Figure 7 is a fragmentary detailed sectional view showing the well in Figure 6 with its movable bottom gravitated into the chute momentarily while the plant is descending the chute to the ground.

Figure 8 is a fragmentary detailed sectional view of the dry soil spreading plow.

Referring to the drawings wherein like numerals designate like parts, it can be seen that numeral 5 denotes a horizontally disposed U-shaped frame having draft equipment 6 at it forward or bight end, to the end that the machine can be drawn by horses. However, this may be substituted for by suitable coupling means whereby a tractor can be used for drawing the machine. Further, it is to be understood that the machine may be self-propelled by an engine, electric motor or other motive means.

At the rear portions of the leg members of the frame 5 are supporting wheels 7. Just rearwardly of the bight portion of the frame, arms 8, 8 extend inwardly in rearwardly converging manner to support ground-engaging disks 9 adapted to pulverize the soil ahead of a plow presently to be referred to.

A second set of disks 10, 10 are carried by the lower ends of a pair of hand bars 11, 11 which are suitably secured in place and extend rearwardly of the machine.

A small plow such as is shown in Figure 8 and generally referred to by numeral 12 is used for cutting a furrow for the plants being set, and preparatory to the operation of watering the same. The plow consists of a channeled and pointed blade 13 having an inclined stem 14 extending forwardly from the upper portion thereof and through a guide 15 on the bight portion of the frame 5. The upper portion of the blade 13 has a pair of rearwardly extending parallel arms 16, 16 which serve to support the lower ends of hose sections 17 depending from water tanks 18.

Fertilizer receptacles 19 are supported on the leg members of the frame 5 and have supply tubes 20 extending therefrom for discharging fertilizer to the area where the roots of the set will find the same.

A pair of posts 21, 22 rise from each leg member of the frame 5 and these are bridged at their lower portions by a shelf 23 upon which the corresponding water tank 18 is supported. Additional securing means 24 are provided between the side of the tank 18 and the posts 21, 22.

Supported by the upper ends of the posts 21, 22 is a circular table 25 having an opening 26 in the forward edge portion thereof. A set guiding chute 27, preferably tapered downwardly, depends from this portion of the table, catching and guiding the sets as they descend, in order to guide the same to fall into the ground trough formed by the plow 12 and within the confines of the arms 16, just as the plow blade 13 is moving dry earth a certain amount of which falls back upon the roots of the plant and this operation is immediately followed by the application of water from the tanks 18. Fertilizer has been supplied from the receptacles 19 and the disks 10, further embed the plant.

Rotatably supported by a pin 28 on the table 25, is a manually operated rotor 29 carrying a plurality of wells 30 for supporting plants, each well being located over an opening 31 in the rotor 29, and in each of the opening 31 is a hinged gate or bottom 32, which will gravitate into the opening 26 and chute 27 (see Figure 1) when the particular well arrives at the front of the table 25, thus releasing the plant so that it can descend the chute 27 and be planted.

As can be seen in Figures 3 and 1, a vertically disposed U-shaped frame 33 rises from the rear portions of the leg members of the frame 5 and this supports a seat 34 upon which a boy can sit and replenish the wells 30 with plants as the machine travels along.

While the foregoing description sets forth the invention in specific terms, it is to be understood that numerous changes in the shape, size and materials may be resorted to without departing from the spirit and scope of the invention as claimed hereinafter.

Having described the invention, what is claimed as new is:

In a plant setting machine; a horizontally disposed U-shaped frame having draft equipment at the forward end thereof; a pair of inwardly and rearwardly converging arms and a pair of legs secured to said frame; wheels at the rear of said legs; plow disks secured to said arms; hand bars carried by said frame and having plow disks at their lower ends; said frame having a bight portion with a guide; means for cutting a furrow for the plants including a blade having an inclined stem extending forwardly from the upper portion thereof and through said guide; a pair of parallel upper portions extending rearwardly from said blade and forming water hose supports; a pair of posts rising from each leg member; a bridge at the lower ends of said posts forming a shelf for a water tank; a table supported by the upper ends of the posts and having an opening in the forward edge portion thereof; a set guide chute passed through said opening; a rotor having a plurality of plant supporting wells and disposed on said table, said rotor having a plurality of apertures and each well being disposed over one of said apertures; and a gate in each opening adapted to gravitate into its opening in the rotor when the particular well arrives at the front of said table.

THOMAS VIRGIL MILLER.

REFERENCES CITED

The following references are of record in the file of this patent:

UNITED STATES PATENTS

| Number | Name | Date |
|---|---|---|
| 351,698 | Harter | Oct. 26, 1886 |
| 426,455 | Leonard et al. | Apr. 29, 1890 |
| 1,657,944 | Stocker et al. | Jan. 31, 1928 |
| 1,787,538 | Bouef et al. | Jan. 6, 1931 |

FOREIGN PATENTS

| Number | Country | Date |
|---|---|---|
| 533,229 | France | Dec. 7, 1921 |
| 554,174 | Great Britain | June 23, 1943 |